United States Patent
Wild et al.

(10) Patent No.: US 10,768,793 B2
(45) Date of Patent: Sep. 8, 2020

(54) USER INTERFACE AND METHOD FOR CHANGING BETWEEN SCREEN VIEWS OF A USER INTERFACE

(71) Applicant: VOLKSWAGEN AG, Wolfsburg (DE)

(72) Inventors: Holger Wild, Berlin (DE); Mark Peter Czelnik, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 65 days.

(21) Appl. No.: 15/309,331

(22) PCT Filed: Feb. 23, 2015

(86) PCT No.: PCT/EP2015/053713
§ 371 (c)(1),
(2) Date: Nov. 7, 2016

(87) PCT Pub. No.: WO2015/169462
PCT Pub. Date: Nov. 12, 2015

(65) Prior Publication Data
US 2017/0075564 A1 Mar. 16, 2017

(30) Foreign Application Priority Data
May 7, 2014 (DE) .................. 10 2014 208 502

(51) Int. Cl.
*G06F 3/0483* (2013.01)
*G06F 3/0482* (2013.01)
(Continued)

(52) U.S. Cl.
CPC ............ *G06F 3/0483* (2013.01); *B60K 37/06* (2013.01); *G06F 3/0482* (2013.01);
(Continued)

(58) Field of Classification Search
CPC .. G06F 3/0482; G06F 3/0483; G06F 3/04845; G06F 3/04883; B06K 37/06
See application file for complete search history.

(56) References Cited

U.S. PATENT DOCUMENTS 6,407,757 B1 * 6/2002 Ho ...................... G06F 3/03547
715/702
8,938,673 B2 * 1/2015 Lee ...................... G06F 3/0483
715/273
(Continued)

FOREIGN PATENT DOCUMENTS

| CN | 101405177 A | 4/2009 |
|---|---|---|
| CN | 101784412 A | 7/2010 |

(Continued)

OTHER PUBLICATIONS

Search Report for German Patent Application No. 10 2014 208 502.0; dated Feb. 5, 2015.
(Continued)

*Primary Examiner* — Justin R. Blaufeld
(74) *Attorney, Agent, or Firm* — Barnes & Thornburg LLP (57) ABSTRACT

A user interface and a method for changing from a first screen view to a second screen view of a user interface. The method includes detecting an input in an approximation region of an input unit, displaying a message at an edge of the first screen view relating to the possibility of changing over to the second screen view, recognizing a predefined gesture of a user, and changing from the first screen view to the second screen view.

11 Claims, 8 Drawing Sheets

(51) Int. Cl.
  *B60K 37/06* (2006.01)
  *G06F 3/0484* (2013.01)
  *G06F 3/0488* (2013.01)
(52) U.S. Cl.
  CPC ...... *G06F 3/04845* (2013.01); *G06F 3/04883* (2013.01); *B60K 2370/113* (2019.05); *B60K 2370/141* (2019.05); *B60K 2370/146* (2019.05); *B60K 2370/1464* (2019.05); *B60K 2370/1468* (2019.05); *B60K 2370/176* (2019.05)

(56) References Cited

U.S. PATENT DOCUMENTS

| | | | | |
|---|---|---|---|---|
| 9,851,896 B2* | 12/2017 | Jitkoff | | G06F 3/04883 |
| 9,953,101 B1* | 4/2018 | Walliser | | G06F 16/9577 |
| 2010/0100841 A1* | 4/2010 | Shin | | G06F 3/0482 715/784 |
| 2010/0169836 A1* | 7/2010 | Stallings | | G06F 3/04817 715/848 |
| 2011/0179368 A1* | 7/2011 | King | | G06F 3/0482 715/769 |
| 2011/0205162 A1* | 8/2011 | Waller | | G06F 3/04883 345/173 |
| 2011/0252346 A1* | 10/2011 | Chaudhri | | G06F 3/04886 715/765 |
| 2011/0265036 A1* | 10/2011 | Hoehne | | B60K 35/00 715/810 |
| 2012/0079432 A1* | 3/2012 | Lee | | G06F 3/04883 715/838 |
| 2012/0084647 A1* | 4/2012 | Homma | | G06F 3/0483 715/273 |
| 2012/0084697 A1* | 4/2012 | Reeves | | G06F 3/0481 715/772 |
| 2012/0167008 A1* | 6/2012 | Zaman | | G06F 40/14 715/814 |
| 2012/0290972 A1* | 11/2012 | Yook | | G06F 3/04883 715/800 |
| 2013/0067392 A1* | 3/2013 | Leonard | | G06F 3/0486 715/784 |
| 2013/0145290 A1* | 6/2013 | Weber | | G06F 3/0483 715/760 |
| 2013/0151987 A1* | 6/2013 | Flynn, III | | G06F 3/0488 715/753 |
| 2013/0321340 A1* | 12/2013 | Seo | | G06F 3/04817 345/174 |
| 2014/0019910 A1* | 1/2014 | Kim | | G06F 3/0482 715/810 |
| 2014/0164907 A1* | 6/2014 | Jung | | G06F 3/0483 715/234 |
| 2015/0169071 A1* | 6/2015 | Jitkoff | | G06F 3/0485 715/863 |
| 2015/0169211 A1* | 6/2015 | Shin | | G06F 3/04847 715/762 |
| 2015/0268811 A1* | 9/2015 | Min | | G06F 3/0488 715/765 |
| 2015/0339031 A1* | 11/2015 | Zeinstra | | G06F 3/04842 715/747 |
| 2018/0048774 A1* | 2/2018 | Hoshino | | H04N 1/32358 |

FOREIGN PATENT DOCUMENTS

| | | |
|---|---|---|
| DE | 102009023897 A1 | 12/2010 |
| DE | 102009046376 A1 | 5/2011 |
| EP | 2246214 A1 | 11/2010 |
| EP | 2801946 A1 | 11/2014 |
| KR | 20080108970 A | 12/2008 |
| KR | 20100114572 A | 10/2010 |
| KR | 101315452 B1 | 10/2013 |
| WO | 2009067224 A1 | 5/2009 |

OTHER PUBLICATIONS

Search Report and Written Opinion for International Patent Application No. PCT/EP2015/053713; dated May 19, 2015.
Office Action for Korean Patent Application No. 10-2016-7033820; dated Jan. 24, 2018.
Office Action for Chinese Patent Application No. 201580023862.9; dated May 3, 2018.
Office Action for Chinese Patent Application No. 201580023862.9; dated Feb. 3, 2019.
Office Action for Chinese Patent Application No. 201580023862.9; dated Jul. 23, 2019.
Office Action for Korean Patent Application No. 10-2018-7022671; dated Apr. 20, 2020.

* cited by examiner

USER INTERFACE AND METHOD FOR CHANGING BETWEEN SCREEN VIEWS OF A USER INTERFACE

PRIORITY CLAIM

This patent application is a U.S. National Phase of International Patent Application No. PCT/EP2015/053713, filed 23 Feb. 2015, which claims priority to German Patent Application No. 10 2014 208 502.0, filed 7 May 2014, the disclosures of which are incorporated herein by reference in their entirety.

SUMMARY

Illustrative embodiments relate to a user interface and to a method for changing from a first screen view to a second screen view. Illustrative embodiments relate to informing the user about the possibility of changing between screen views and assisting the user in carrying out the change.

BRIEF DESCRIPTION OF THE DRAWINGS

Exemplary embodiments are described in detail below with reference to the accompanying drawings, in which.

DETAILED DESCRIPTION

For operating user interfaces, gestures that involve contact with a user interface (for example, a touchscreen) and gestures that are carried out freely in space (3D gestures) are known. Generally, the possibility of changing between screen views with the aid of swipe gestures is also known. However, depending on the design of the user interface, the individual user is not always aware of this possibility and, depending on the situation, a swipe gesture that involves contact with the user interface can sometimes only be carried out with difficulties.

For example, a swipe gesture for changing between two screen views is known from the Android operating system for mobile devices. It does not however envisage moving individual operating areas/tiles of a screen view. When used in a vehicle, moving a home screen in a way analogous to a method involving contact requires increased hand-eye coordination, which leads to the requirement for increased attentiveness on the part of the user while driving.

Disclosed embodiments allow interaction with individual tiles of the home screen by means of swipe gestures even though it is intended that changing between two home screens can likewise be carried out by swipe gestures.

Disclosed embodiments provide a method and a user interface. The method serves for changing from a first screen view to a second screen view of a user interface. The screen views may be designed, for example, as so-called home screens. A home screen is understood within the scope of the disclosed embodiments as meaning such a screen view in which information areas ("tiles") for different functional areas are arranged next to one another. Such tiles can often be freely configured, moved and assigned to other home screens by the user. A content-specific function call by interaction with a tile of the home screen is not envisaged, but instead the tiles merely serve for reproducing information for different area. In a first operation, an input means (for example, a hand of a user) is sensed in an approach area of an input unit. The approach area is a sensing area of a sensor, which is assigned to the presumed wish for interaction of the user with the user interface. For example, such an approach area may be in a spatial area in front of a display means ("screen") or a sensor for operating the user interface. In response to the sensed input means, a message about the possibility of changing to the second screen view is displayed at an edge of the first screen view. In this way, the user is prompted to leave the current screen view, if required, and to use a further screen view. The message may be arranged at the edge in the direction of which the second screen view is arranged (virtually). If swiping to the left causes the display of a screen view drawn onto the screen from the right, the message may be arranged at the right edge of the screen. In this way, a swiping interaction with the message itself can take place in the direction of the middle of the screen or the opposite edge. The same applies correspondingly to the case where the second screen view is arranged (virtually) on the left of the home screen displayed currently, whereby a swipe gesture to the right can interact with a message arranged at the left edge of the screen. It goes without saying that it is not essential to touch a display element/input element. Finally, the disclosed embodiments may also use 3D gestures for changing between the screen views. According to the disclosed embodiments, only a gesture that is predefined for the change is detected and initiates the change from the first screen view to the second screen view.

According to a second disclosed embodiment, a user interface which comprises a screen, an input unit and an evaluation unit is proposed. The screen may, for example, be designed as a matrix display, which makes the display of any content possible. The input unit may comprise an approach sensor system and be designed to sense gestures for operating the user interface. The evaluation unit may, for example, comprise a programmable processor and be designed as an electronic control unit (ECU). It is designed to sense an input means in an approach area. What was said in connection with the disclosed method applies correspondingly to the approach area. The screen is designed to display a message about the possibility of changing to a second screen view at an edge of a first screen view. The message may be designed, for example, as a "tab" or move handle (operating element for accepting an interaction), to which a predefined gesture of a user relates. In response to the detection of the predefined gesture, the evaluation unit instigates a change from the first screen view to the second screen view. The features, combination of features and resultant benefits correspond to those stated in connection with the first-mentioned disclosed embodiment so clearly that, to avoid repetition, reference is made to the previous statements.

The predefined gesture may be, for example, a 3D gesture that is carried out freely in space. For changing between home screens, horizontal swipe gestures have in the meantime become established in various operating systems. The 3D gesture may be oriented from the direction of the message in the direction of a middle of the screen view (or a mid-perpendicular of the screen). In this way, touching of the input unit is not required, which makes reliable and convenient operation possible even without precise activation of a move handle. Operating in this way by means of gestures is, therefore, of benefit when operating the vehicle-bound functions while driving over an uneven surface.

If the message is designed as a move handle, the predefined gesture may, for example, be a gesture of tapping the move handle, in response to which the second screen view that is assigned to the message is automatically called. The call may take place, for example, in a way corresponding to a call by a swipe gesture, by which the second screen view "pushes" the first screen view out of the visible area. Alternatively, the predefined gesture may be a swipe gesture that begins at the move handle and is oriented in the direction of a middle of the screen view (or a mid-perpendicular of the screen). In this way it is possible to distinguish between changing the screen views from an interaction with the entire first screen view and an interaction with tiles/functional areas displayed on the first screen view. As a result, a moving (dragging) gesture relating to individual tiles is still possible, while an interaction by swipe gestures can also be used for changing the screen views. Such different possibilities for interaction are not accessible to a broad range of users without a message.

The displaying of the message may take place only in response to the further condition of detection of a second predefined gesture. In other words, the second predefined gesture first has to be sensed and classified as a key gesture for starting 3D gesture operation, so that the user interface or the sensor system used performs detections in the approach area or acknowledges them by outputting the message. In this way it can be prevented that inadvertently crossing the approach area triggers the output of the message or a change from a first screen view to a second screen view, without the user having such an intention. In this way, operating errors are avoided and the acceptance of a user interface designed according to the disclosed embodiments on the part of the user is ensured.

The aforementioned embodiments relate equally to the disclosed method and to the disclosed user device. According to a third disclosed embodiment, the latter may be designed, for example, as a wireless communication device (for example, a smartphone, tablet PC, a PDA, etc.). Here, the user interface often comprises a camera, which is pointed in the direction of the user. This serves, for example, for carrying out videotelephony and can also be used for the approach sensing and gesture detection. In response to the sensing of the input means in this detection area, the screen of the wireless communication device may display a message, arranged, for example, at the left and/or right edge, by which the user is informed about the possibility of changing to a second screen view or to two second screen views.

According to a fourth disclosed embodiment, a means of transportation which has a user interface according to the disclosed embodiments is proposed. In this case, the screen may be integrated as an instrument cluster and/or as a central information display in the dashboard of the means of transportation. The input unit may, for example, comprise an infrared LED strip arranged in the center console and/or an optical camera arranged in the roofliner over the center console. The evaluation unit may be designed as an electronic control unit, which comprises a programmable processor. The computing power that is required for carrying out the disclosed method may in this case also be provided by hardware that is shared with other functions. In the case of use in a means of transportation, the disclosed embodiments make quick and deliberate operation of the user interface possible, whereby the user can primarily direct his or her attention to the traffic on the road. This increases road safety and makes efficient and reliable operation of the user interface possible even while driving.

Figure 1:
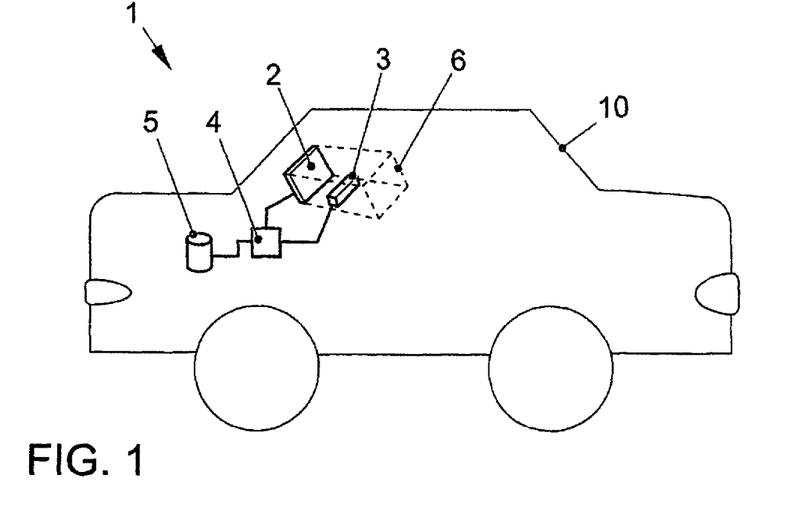
FIG. 1 shows a schematic view of components of an exemplary embodiment of a user interface in an exemplary embodiment of a means of transportation designed according to the disclosed embodiments.

FIG. 1 shows a passenger car 10 as a means of transportation, in which a user interface 1 according to an exemplary embodiment is provided. The screen 2 is recessed into the dashboard of the car 10 and connected in terms of communication to an electronic control unit 4. Arranged underneath the screen 2 is an infrared LED strip 3 as an input unit, over which an approach area 6 is set up in front of the screen 2. Input means of a user that are located in the approach area 6 are consequently sensed by the infrared LED strip 3 and reported to the electronic control unit 4. From the signals of the infrared LED strip 3, the electronic control unit 4 detects the presence of the input means and any gestures that are carried out. These may be classified by matching with references stored in a data memory 5. In response to a successful match, a function associated with the predefined gesture can be carried out.

Figure 2:
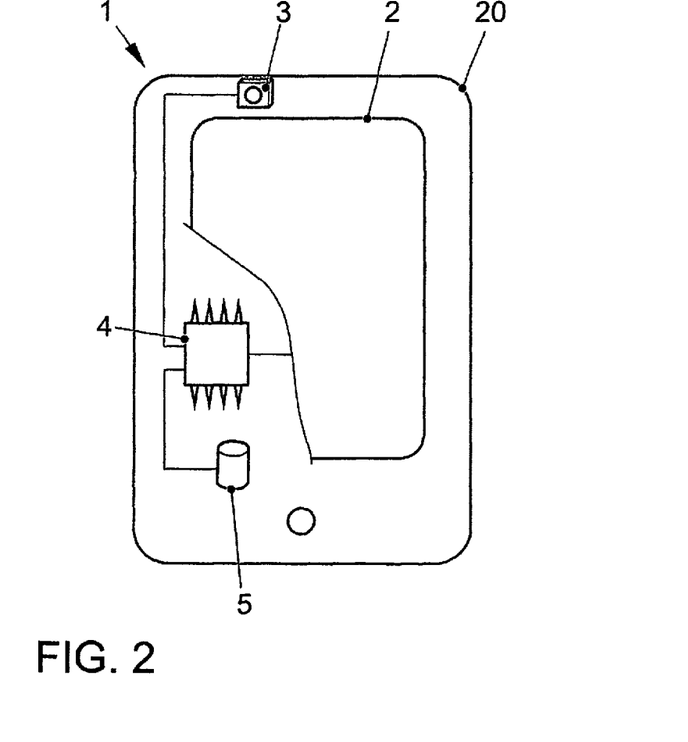
FIG. 2 shows a schematic view of components of an exemplary embodiment of a user interface in an exemplary embodiment of a wireless communication device designed according to the disclosed embodiments.

FIG. 2 shows a tablet PC 20 as a user device, in which a user interface 1 designed according to the disclosed embodiments is provided. The optical camera 3, which can also be used for videotelephony, is for this purpose connected in terms of communication to a programmable processor 4 as an evaluation unit. Provided for the matching with gestures sensed by the camera 3 is a data memory 5, in which references for classes of predefined gestures are stored. For the aforementioned components to be identified, the screen 2 of the tablet PC 20 is cut out in certain portions.

Figure 3:
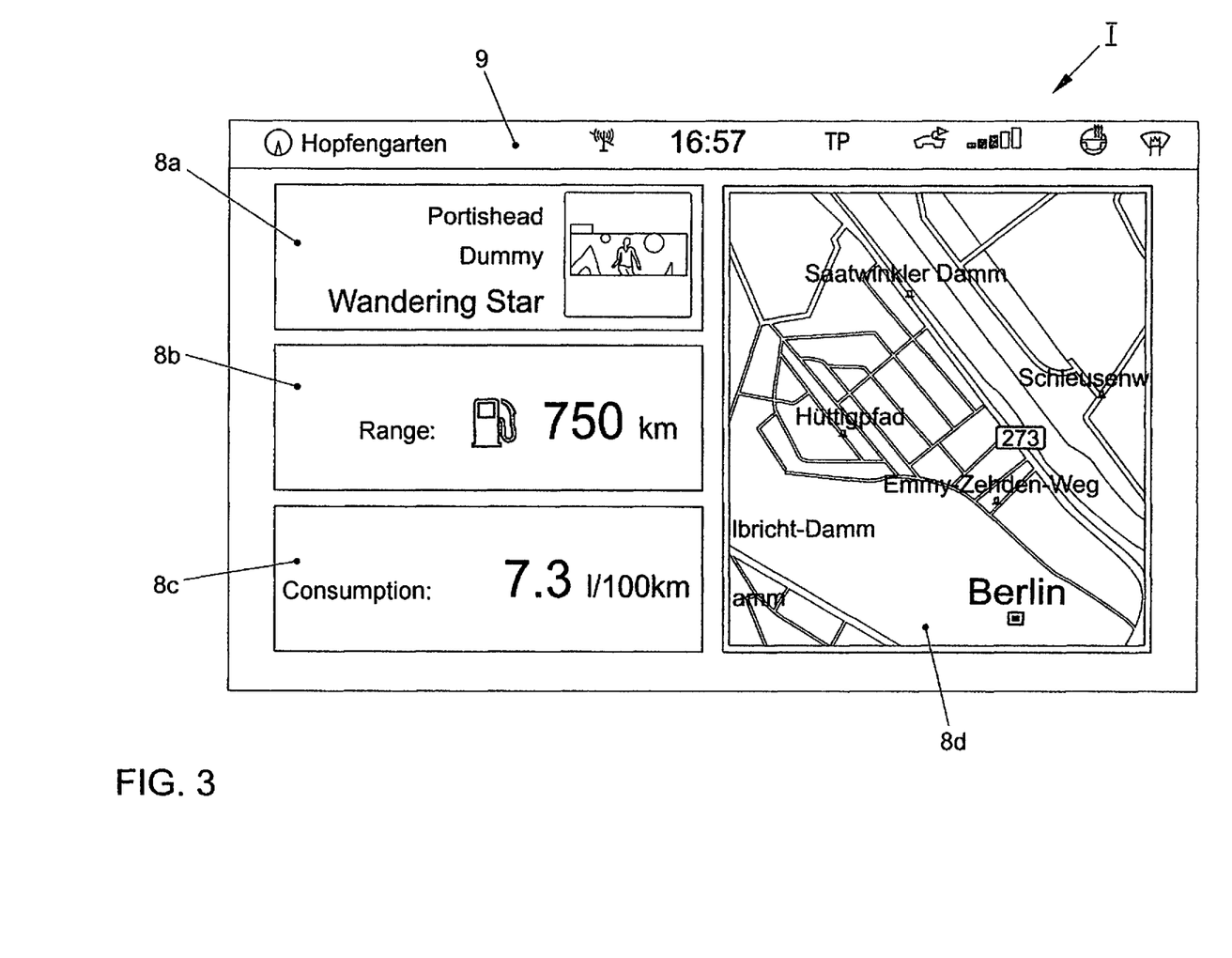
FIG. 3 shows a first screen view of a home screen of an exemplary embodiment of a user interface designed according to the disclosed embodiments.

FIG. 3 shows an exemplary embodiment of a first home screen I as a first screen view of a user interface according to the disclosed embodiments. Arranged at the upper edge of the home screen is a status bar 9, which shows a summary with respect to the operating state of the user interface according to the disclosed embodiments or functions associated with it. Represented underneath the status bar 9 on the left half of the screen are three tiles 8a, 8b, 8c arranged one above the other, which can be moved and/or changed by drag-and-drop gestures, as can a tile 8d arranged on the right half of the screen. The first tile 8a is assigned to playing music. The second tile 8b is assigned to a currently estimated range. The third tile 8c is assigned to an average consumption of a means of transportation. The fourth tile 8d, arranged on the right side of the screen, shows a detail of a map for a navigating function.

Figure 4:
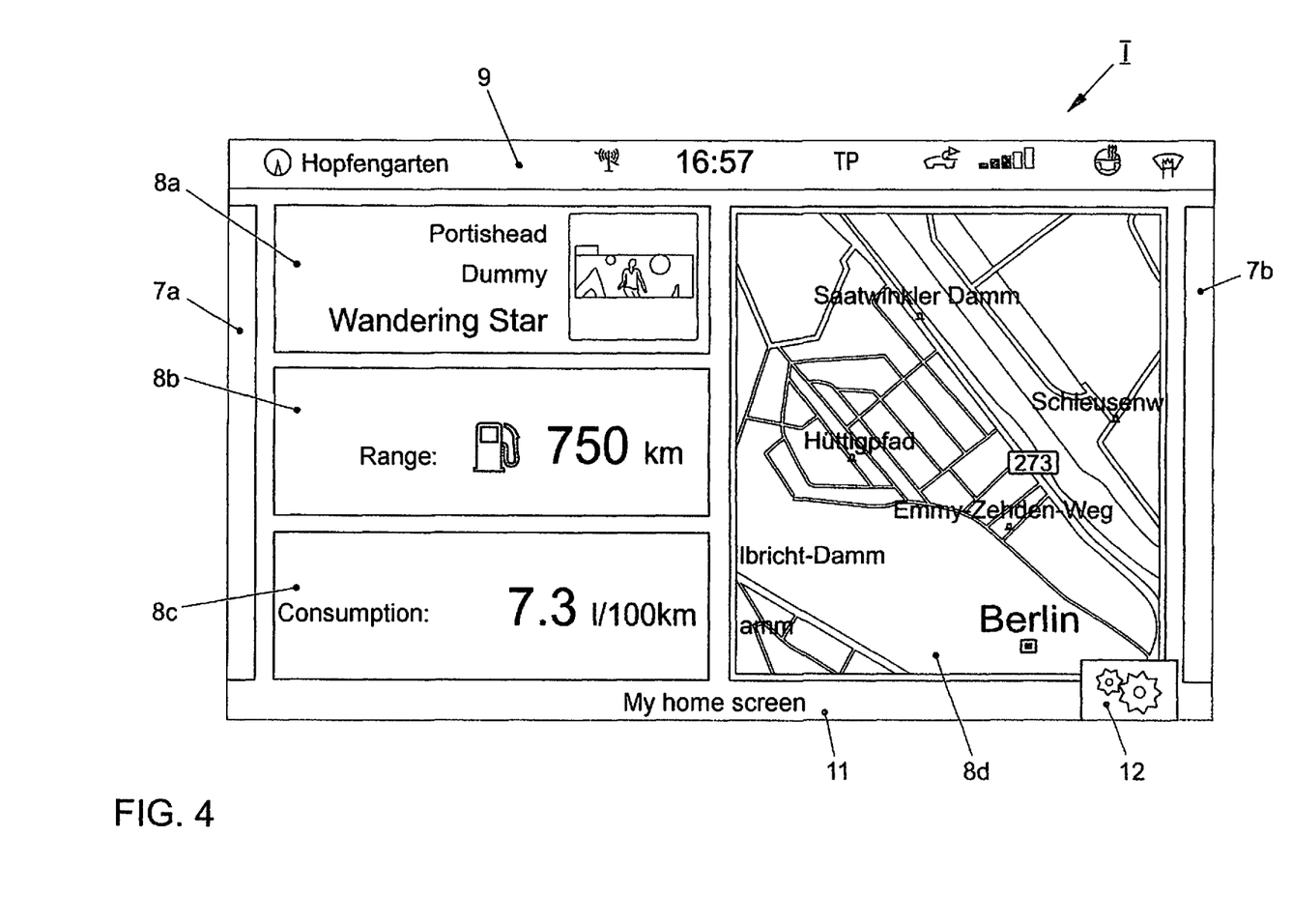
FIG. 4 shows a second screen view of a home screen of an exemplary embodiment of a user interface designed according to the disclosed embodiments.

FIG. 4 shows the representation shown in FIG. 3 after the approach sensor system has detected the presence of an input means in an approach area. In response to this, two tab-like move handles 7a, 7b are displayed as messages to the left and right of the tiles 8a, 8b, 8c, 8d. The move handles 7a, 7b in this case extend in a narrow vertical edge region along the entire height of the tiles. For changing from the first home screen I, which is represented, to a second home screen (not represented), several possibilities are thus available to the user. Either he or she makes a 3D swipe gesture to the left or right to reach a second home screen arranged to the right or left of the first home screen I that is represented. Alternatively, the user may carry out a tapping gesture on the first move handle 7a or on the second move handle 7b. A third possibility for changing to a second or third home screen is to touch the respective move handle 7a, 7b and draw it in the direction of the separating line between the first three tiles 8a, 8b, 8c and the fourth tile 8d. This retains the possibility of a drag-and-drop interaction with the individual tiles 8a, 8b, 8c, 8d, without such an interaction bringing about a change (undesired in this case) to the second or third home screen. In response to the detection of an approach, a button 12, by means of which the user can enter an editing mode, is displayed underneath the fourth tile 8d. For example, the button 12 may be used to adapt the designation 11 of the home screen I that is represented.

Figure 5:
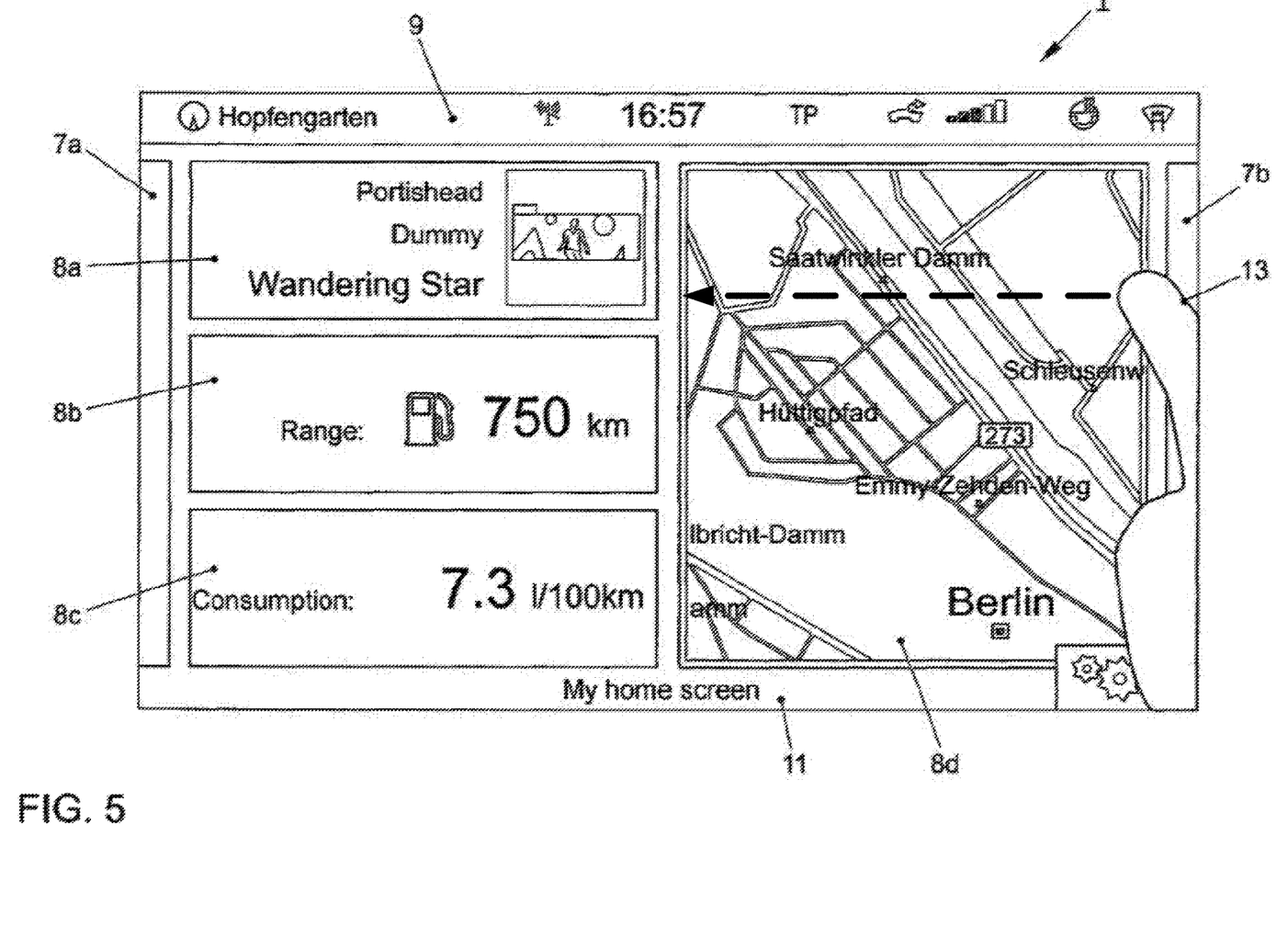
FIG. 5 shows a schematic representation of an operation with respect to a screen view of an exemplary embodiment of a user interface designed according to the disclosed embodiments.

FIG. 5 shows the screen view I shown in FIG. 4, in which the hand 13 of the user is carrying out a tapping gesture with respect to the move handle 7b arranged at the right edge of the screen. In response to this, a second home screen II (see FIG. 6), arranged (virtually) to the right alongside the first home screen I that is represented, pushes the first home screen I out of the viewing area over the left edge of the screen.

Figure 6:
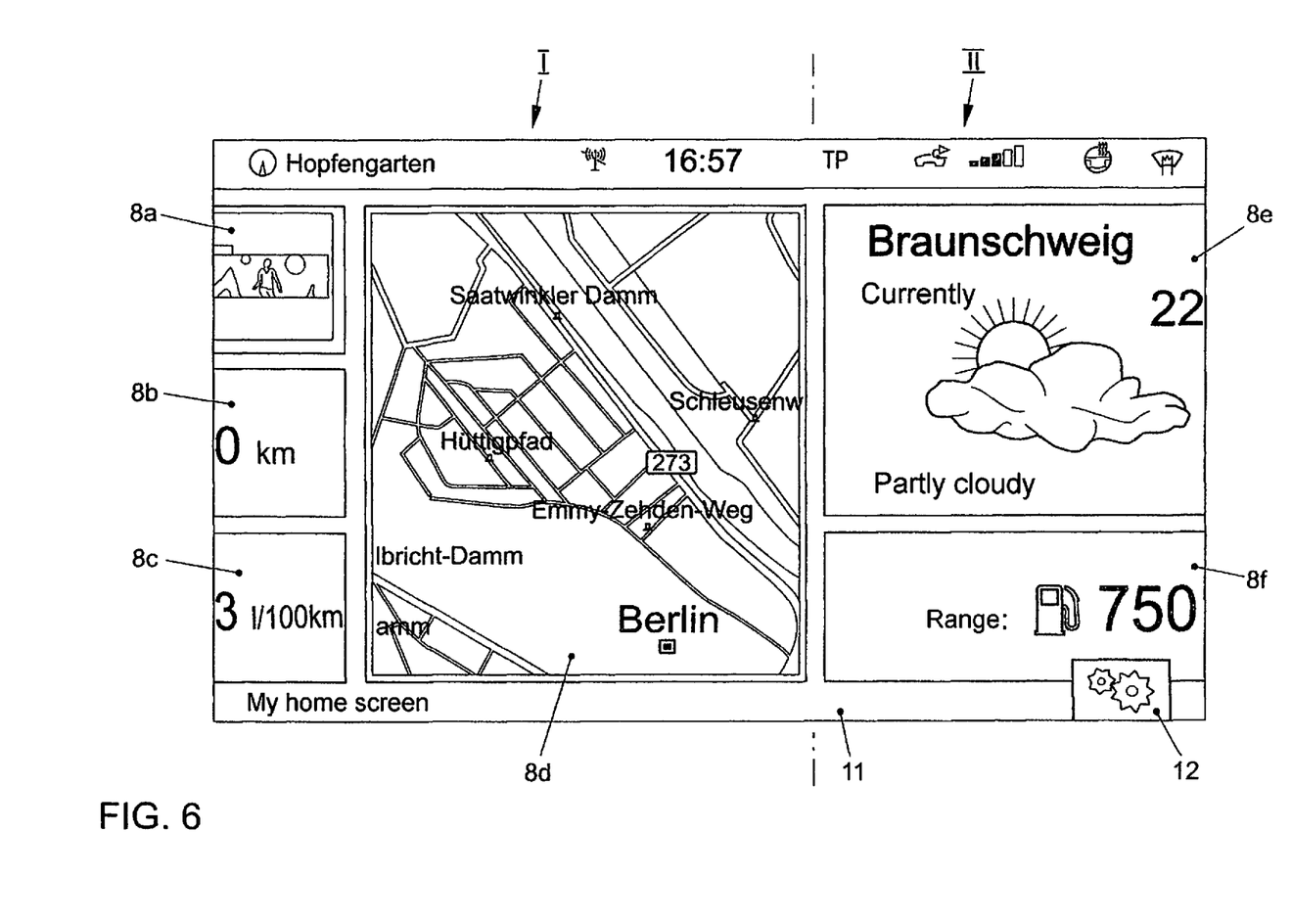
FIG. 6 shows a representation of a change between a first screen view and a second screen view of an exemplary embodiment of a user interface designed according to the disclosed embodiments.
Figure 7:
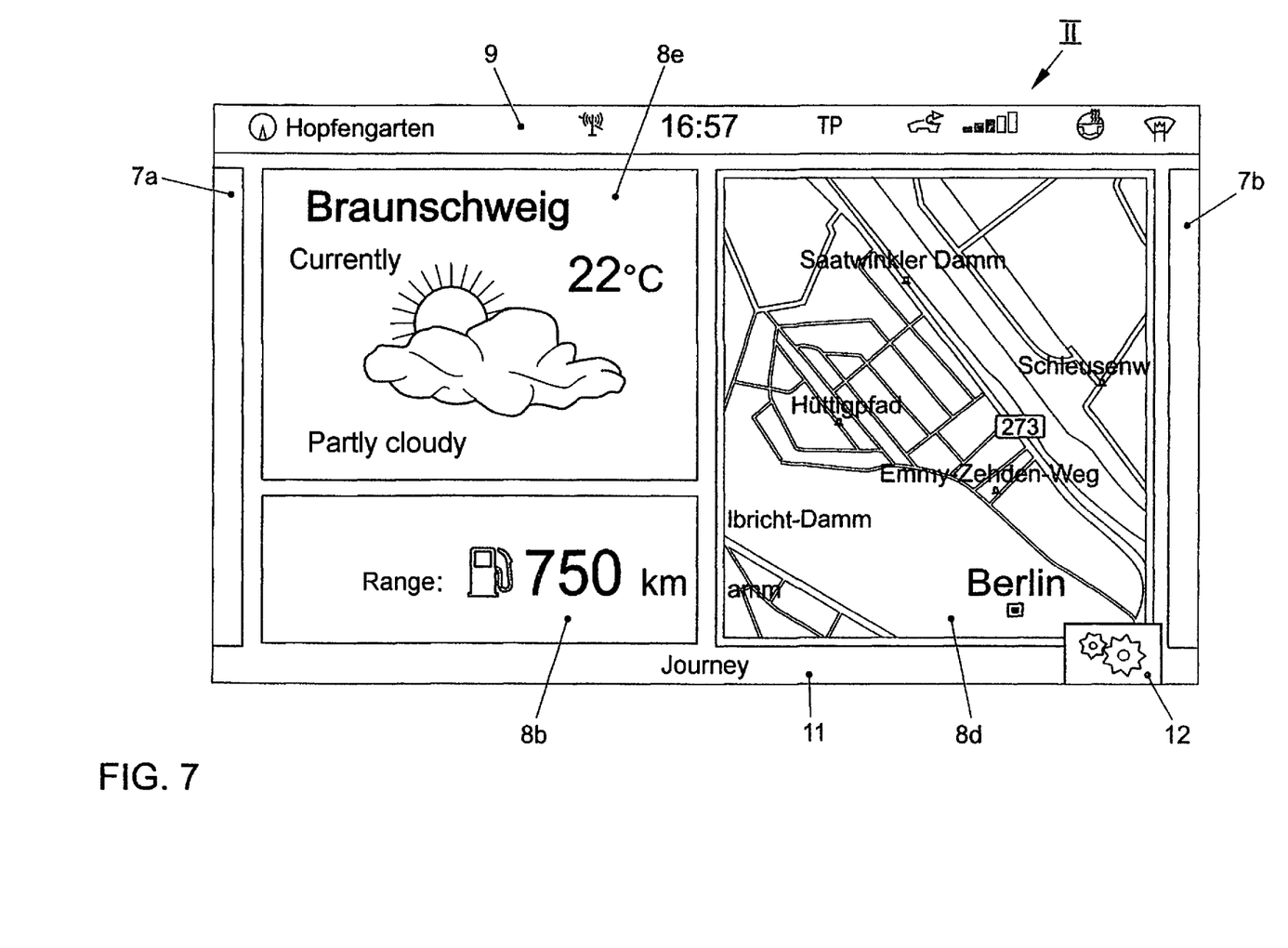
FIG. 7 shows a representation of a second screen view of an exemplary embodiment of a user interface designed according to the disclosed embodiments.

FIG. 6 shows the change from a first home screen I as the first screen view to a second home screen II as the second screen view. The designation 11 of the first home screen I is thereby also moved to the left out of the visible area, while the button 12 for calling the editing mode remains fixed in the lower right-hand corner of the visible area. FIG. 7 shows an exemplary embodiment of the second home screen II, which only has 3 tiles 8b, 8d and 8e. In comparison with the first home screen I, the first tile 8a for playing music and the third tile 8c for the current consumption have been replaced by a fifth tile 8e for the weather currently in Braunschweig. The fifth tile 8e is arranged here exactly where the first tile 8a and the second tile 8b were previously arranged. The second tile 8b is now arranged underneath the fifth tile 8e. The designation 11 of the second home screen II reads: "Trip". Correspondingly, the fourth tile 8d is still devoted to the previously displayed map detail.

Figure 8:
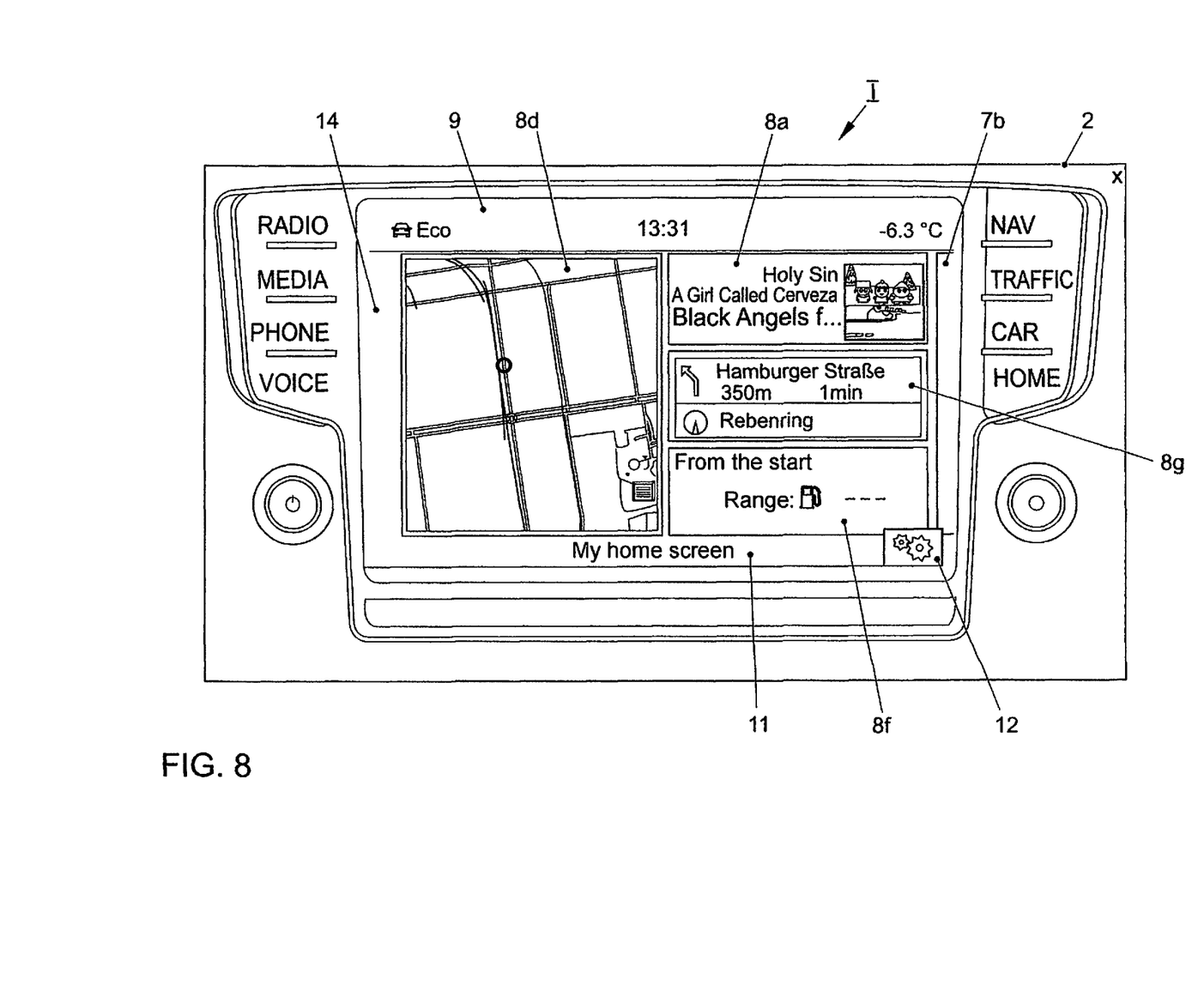
FIG. 8 shows a representation of a first screen view, which merely has a single second screen view arranged (virtually) to its right.

FIG. 8 shows an alternative representation of a first screen view I on a screen 2 of a user interface according to the disclosed embodiments Here, the left half of the screen is filled with a map detail as a fourth tile 8d, while the right half of the screen shows three tiles 8a, 8g, 8f arranged one above the other. In response to a detected approach of an input means, a move handle 7b is only displayed as a message at the right edge of the screen. A corresponding first move handle is not provided at the left edge of the screen 14, since no (virtual) further home screen is arranged to the left of the third home screen III that is represented. As described above, the user can use the second move handle 7b at the right edge of the screen to reach a further home page arranged (virtually) to the right of the representation shown.

Figure 9:
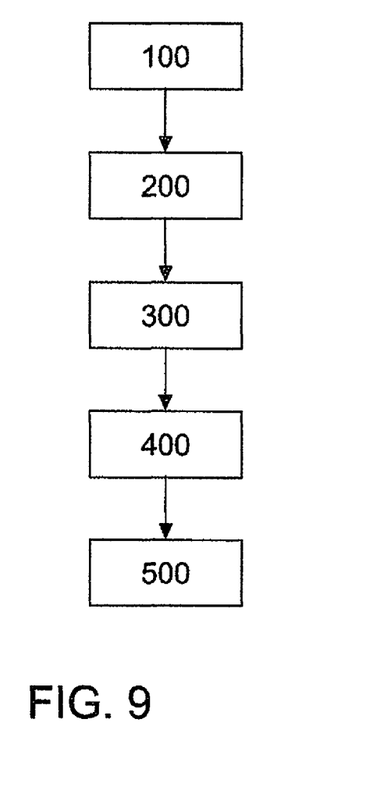
FIG. 9 shows a flow diagram illustrating operations of an exemplary embodiment of a disclosed method.

FIG. 9 shows a flow diagram illustrating operations of an exemplary embodiment of a disclosed method. In a first operation at 100, a key gesture is detected as a second predefined gesture. This starts the contactless interaction with the user interface according to the disclosed embodiments. In operation at 200, the presence of the input means in the approach area of the input unit is sensed and in response thereto, in operation at 300 a message about the possibility of changing to a second screen view is displayed at an edge of a current screen view. In operation at 400, a predefined gesture of a user, carried out as a contactless 3D swipe gesture in a corresponding spatial area or as a tapping gesture or as a swipe gesture in interaction with the message, is subsequently detected in response, whereupon in operation at 500 the first screen view is exchanged for a second screen view.

Even if the disclosed embodiments have been described in detail in connection with the enclosed figures of the drawings, modifications and combinations of features of the exemplary embodiments represented are possible for a person skilled in the art, the scope of which is defined by the accompanying claims.

LIST OF DESIGNATIONS 1 user interface
2 screen
3 input unit
4 evaluation unit
5 data memory
6 approach area
7a,7b message
8a,8b,8c,8d,8e,8f,8g tiles
9 status bar
10 passenger car
11 designation
12 button
13 hand of the user
14 edge of screen without message
20 tablet PC
100-500 method operations
I first home screen
II second home screen

The invention claimed is:

1. A method for changing display from a first screen view to a second screen view of a transportation vehicle user interface that includes a screen, an input unit and an evaluation unit, the method comprising:
 displaying a status bar along an upper or lower edge of the screen, a first designation corresponding to the first screen view within a designation field along the edge of the screen opposite the status bar, a first plurality of tiles within a screen view field therebetween, and a button that overlaps the designation field and at least a portion of the screen view field;
 sensing an input means in an approach area of the input unit, wherein the approach areas is a predetermined space in front of, but not including the surface of the screen;
 displaying, in response sensing the input means in the approach area, a left move handle and a right move handle, the move handles indicating a possibility of changing output on the screen from the first screen view to the second screen view,
 wherein the left and right move handles are respectively output on the left and right edges of the screen within the first screen view, and wherein each move handle extends along an entire height of the first plurality of tiles without displaying the content of the second screen view, and wherein the detection of swipe gestures enables user interaction with individual tiles of the first screen view and the second screen view as well as changing between the first screen view and the second screen view;

detecting a predefined gesture of the user, wherein the predefined gesture is associated with at least one of the move handles; and in response to the detection of the predefined gesture:

moving the first plurality of tiles off the screen while a plurality of tiles corresponding to the second screen view onto the screen within the screen view field, moving the first designation off the screen while moving a second designation corresponding to the second screen view onto the screen within the designation field, wherein the button and the status bar remain fixed at their respective positions while the tiles and the designations are moving.

2. The method of claim 1, wherein the second predefined gesture comprises a horizontal swipe gesture carried out freely in space oriented from the direction of one of the move handles and toward the direction of a middle of the screen.

3. The method of claim 1, wherein the predefined gesture comprises a swipe gesture starting on the left or right move handle and oriented in the direction of a middle of the screen.

4. The method of claim 1, wherein the input means is a hand of a user.

5. A transportation vehicle user interface comprising:

a screen displaying a status bar along an upper or lower edge of the screen, a first designation corresponding to the first screen view within a designation field along the edge of the screen opposite the status bar, a first plurality of tiles within a screen view field therebetween, and a button that overlaps the designation field and at least a portion of the screen view field;

a processor having an input unit and an evaluation unit; and a memory having a plurality of instructions stored thereon that, when executed by the processor, causes:

the input unit to sense an input means in an approach area, wherein the approach areas is a predetermined space in front of, but not including the surface of the screen, the screen to display, in response to the sensed input means in the approach area, a left move handle and a right move handle, the move handles indicating a possibility of changing output on the screen from a first screen view to a second screen view, wherein the left and right move handles are respectively output at left and right edges of the screen and within the first screen view, and wherein each move handle extends along an entire height of the first plurality of tiles without displaying the content to the second screen view, and wherein detection of swipe gestures enables user interaction with individual tiles of the home screens as well as changing between the first and second screen view, the evaluation unit to detect a predefined gesture of the user associated with at least one of the move handles, and in response to the detection of the predefined gesture:

the first plurality of tiles are moved off the screen while a plurality of tiles corresponding to the second screen view are moved onto the screen within the screen view field, the first designation is moved off the screen while a second designation corresponding to the second screen view is moved onto the screen within the designation field, wherein the button and the status bar remain fixed at their respective positions while the tiles and the designations are moving.

6. The user interface of claim 5, wherein the user interface is configured to provide wireless communication.

7. A transportation vehicle comprising the user interface of claim 5.

8. The user interface of claim 5, wherein the predefined gesture comprises a horizontal swipe gesture carried out freely in space oriented from the direction of one of the left or right move handles in the direction of a middle of the screen.

9. The user interface of claim 5, wherein the predefined gesture comprises a swipe gesture starting on the left or right move handle and oriented in the direction of a middle of the screen.

10. The user interface of claim 5, wherein the input means is a hand of a user.

11. The user interface of claim 5, wherein displaying the notification message only takes place in response to detection of the first predefined gesture.

* * * * *